US009071995B2

(12) United States Patent  (10) Patent No.: US 9,071,995 B2
Asokan et al.  (45) Date of Patent: Jun. 30, 2015

(54) METHODS, SYSTEMS, AND COMPUTER READABLE MEDIA FOR LONG TERM EVOLUTION (LTE) UPLINK DATA PROCESSING

(75) Inventors: Ram Asokan, Cary, NC (US); Wilson Qiu, Milpitas, CA (US); Kalyan Sundhar, Cary, NC (US)

(73) Assignee: Ixia, Calabasas, CA (US)

( * ) Notice: Subject to any disclaimer, the term of this patent is extended or adjusted under 35 U.S.C. 154(b) by 632 days.

(21) Appl. No.: 13/352,058

(22) Filed: Jan. 17, 2012
(Under 37 CFR 1.47)

(65) Prior Publication Data
US 2013/0184023 A1  Jul. 18, 2013

(51) Int. Cl.
*H04W 72/04* (2009.01)
*H04W 24/08* (2009.01)
*H04L 1/00* (2006.01)
*H04W 24/06* (2009.01)
*H04W 88/02* (2009.01)

(52) U.S. Cl.
CPC ............ *H04W 24/08* (2013.01); *H04L 1/0042* (2013.01); *H04W 24/06* (2013.01); *H04W 88/02* (2013.01)

(58) Field of Classification Search
USPC ................... 370/203, 315, 329, 342; 455/436
See application file for complete search history.

(56) References Cited

U.S. PATENT DOCUMENTS

| | | |
|---|---|---|
| 5,561,841 A | 10/1996 | Markus |
| 5,850,386 A | 12/1998 | Anderson et al. |
| 6,125,072 A | 9/2000 | Wu |
| 6,771,957 B2 | 8/2004 | Chitrapu |
| 6,996,772 B2 | 2/2006 | Justice et al. |
| 7,286,802 B2 | 10/2007 | Beyme et al. |
| 7,543,054 B1 | 6/2009 | Bansod et al. |
| 7,570,922 B2 | 8/2009 | Williams |
| 7,706,347 B2 * | 4/2010 | Kim et al. ..................... 370/342 |
| 7,765,313 B2 | 7/2010 | Jain et al. |
| 7,813,262 B1 | 10/2010 | Rao |
| 7,856,029 B2 | 12/2010 | Osterling et al. |
| 8,229,416 B2 | 7/2012 | Akman et al. |
| 8,601,585 B2 | 12/2013 | Beddoe et al. |

(Continued)

FOREIGN PATENT DOCUMENTS

| | | |
|---|---|---|
| EP | 1 474 942 B1 | 5/2007 |
| WO | WO 03/069814 A2 | 8/2003 |

OTHER PUBLICATIONS

Notice of Allowance and Fee(s) Due for U.S. Appl. No. 13/396,577 (Dec. 18, 2013).

(Continued)

*Primary Examiner* — Michael Thier
*Assistant Examiner* — Vincelas Louis
(74) *Attorney, Agent, or Firm* — Jenkins, Wilson, Taylor & Hunt, P.A.

(57) ABSTRACT

Methods, systems, and computer readable media for performing long term evolution (LTE) uplink data processing are disclosed. One method occurs at an LTE multi-UE simulator. The method includes receiving at least one transport data block containing uplink data to be transmitted to a device under test and dynamically assigning, using processing information associated with the at least one transport data block, at least one physical resource from a plurality of dynamically assignable physical resources for processing the at least one transport block includes receiving at least one transport data block containing uplink data to be transmitted to a device under test.

17 Claims, 8 Drawing Sheets

UPLINK PARALLEL ARCHITECTURE:
OVERVIEW

(56) References Cited

U.S. PATENT DOCUMENTS

| | | | |
|---|---|---|---|
| 8,724,498 | B2 | 5/2014 | Choi et al. |
| 8,738,985 | B2 | 5/2014 | Deng et al. |
| 8,793,117 | B1 | 7/2014 | Varshney et al. |
| 8,855,070 | B2 | 10/2014 | Deng et al. |
| 8,892,829 | B2 | 11/2014 | Asokan |
| 2003/0036403 | A1 | 2/2003 | Shiu et al. |
| 2005/0220047 | A1* | 10/2005 | Baey et al. ............... 370/315 |
| 2006/0276195 | A1 | 12/2006 | Nordling |
| 2007/0091921 | A1 | 4/2007 | Elliot et al. |
| 2009/0052473 | A1 | 2/2009 | Choi et al. |
| 2009/0077456 | A1 | 3/2009 | Pi et al. |
| 2009/0077457 | A1 | 3/2009 | Ramesh et al. |
| 2009/0100300 | A1 | 4/2009 | Kim |
| 2009/0196244 | A1 | 8/2009 | Chun et al. |
| 2009/0245187 | A1 | 10/2009 | Nam et al. |
| 2010/0075678 | A1* | 3/2010 | Akman et al. ............. 455/436 |
| 2010/0165847 | A1 | 7/2010 | Kamuf et al. |
| 2010/0184447 | A1 | 7/2010 | Miki et al. |
| 2010/0195743 | A1 | 8/2010 | Barsoum et al. |
| 2010/0272011 | A1 | 10/2010 | Palanki et al. |
| 2010/0290371 | A1 | 11/2010 | Beale |
| 2010/0303011 | A1 | 12/2010 | Pan et al. |
| 2010/0331030 | A1 | 12/2010 | Nory et al. |
| 2011/0032925 | A1 | 2/2011 | Lee et al. |
| 2011/0044196 | A1 | 2/2011 | Ishii |
| 2011/0076962 | A1 | 3/2011 | Chen et al. |
| 2011/0086659 | A1 | 4/2011 | Yoon et al. |
| 2011/0110315 | A1 | 5/2011 | Chen et al. |
| 2011/0119552 | A1 | 5/2011 | Park et al. |
| 2011/0158333 | A1 | 6/2011 | Nakano et al. |
| 2011/0170439 | A1 | 7/2011 | Miki et al. |
| 2011/0206151 | A1 | 8/2011 | McCloud et al. |
| 2011/0235586 | A1 | 9/2011 | Han et al. |
| 2011/0302390 | A1 | 12/2011 | Copeland et al. |
| 2012/0033650 | A1 | 2/2012 | Ahn et al. |
| 2012/0039246 | A1 | 2/2012 | Zhang et al. |
| 2012/0042226 | A1 | 2/2012 | Ramesh et al. |
| 2012/0051271 | A1 | 3/2012 | Beale |
| 2012/0063384 | A1 | 3/2012 | Bi et al. |
| 2012/0093249 | A1 | 4/2012 | Sun et al. |
| 2012/0094651 | A1 | 4/2012 | Chun et al. |
| 2012/0150521 | A1 | 6/2012 | Balkwill |
| 2012/0170524 | A1 | 7/2012 | Ren et al. |
| 2012/0204081 | A1 | 8/2012 | Fresia et al. |
| 2013/0010724 | A1 | 1/2013 | Han et al. |
| 2013/0024753 | A1 | 1/2013 | Masuda et al. |
| 2013/0034062 | A1 | 2/2013 | Seo et al. |
| 2013/0058240 | A1 | 3/2013 | Kim et al. |
| 2013/0058294 | A1 | 3/2013 | Miki et al. |
| 2013/0058306 | A1 | 3/2013 | Noh et al. |
| 2013/0060735 | A1 | 3/2013 | Haddy et al. |
| 2013/0070689 | A1 | 3/2013 | Liu et al. |
| 2013/0070690 | A1 | 3/2013 | Moon et al. |
| 2013/0088973 | A1 | 4/2013 | Yang et al. |
| 2013/0115987 | A1 | 5/2013 | Yoo et al. |
| 2013/0121168 | A1 | 5/2013 | Luo et al. |
| 2013/0121295 | A1 | 5/2013 | Saito et al. |
| 2013/0155867 | A1 | 6/2013 | Asokan et al. |
| 2013/0155872 | A1 | 6/2013 | Subramanian et al. |
| 2013/0155878 | A1 | 6/2013 | Deng et al. |
| 2013/0208600 | A1 | 8/2013 | Campbell et al. |
| 2013/0208603 | A1 | 8/2013 | Choi et al. |
| 2013/0227092 | A1 | 8/2013 | Maestas |
| 2013/0227233 | A1 | 8/2013 | Asokan |
| 2013/0235727 | A1 | 9/2013 | Campbell et al. |
| 2013/0275606 | A1 | 10/2013 | Iyer |
| 2014/0185425 | A1* | 7/2014 | Kim et al. ............... 370/203 |
| 2014/0269361 | A1 | 9/2014 | Asokan et al. |

OTHER PUBLICATIONS

Non-Final Office Action for U.S. Appl. No. 13/447,160 (Nov. 8, 2013).

Non-Final Office Action for U.S. Appl. No. 13/431,975 (Oct. 10, 2013).

Non-Final Office Action for U.S. Appl. No. 13/326,264 (Oct. 10, 2013).

Non-Final Office Action for U.S. Appl. No. 13/154,166 (Aug. 19, 2013).

Non-Final Office Action for U.S. Appl. No. 13/396,577 (Aug. 8, 2013).

Radio Electronics, "LTE CA: Carrier Aggregation Tutorial," pp. 1-7 (Printed from the Internet Aug. 7, 2013).

Share Technote, "Frame Structure—Downlink," pp. 1-11 Aug. 7, 2013).

Non-Final Office Action for U.S. Appl. No. 13/336,005 (Jul. 2, 2013).

Commonly assigned, co-pending U.S. Appl. No. 13/835,658 for "Methods, Systems, and Computer Readable Media for Utilizing Adaptive Symbol Processing in a Multiple User Equipment (Multi-UE) Simulator," (unpublished, filed Mar. 15, 2013).

3rd Generation Partnership Project, "Technical Specification Group Radio Access Network; Evolved Universal Terrestrial Radio Access (E-UTRA); Physical layer procedures (Release 11)," 3GPP TS 36.213, V11.2.0, pp. 1-173 (Feb. 2013).

3rd Generation Partnership Project, "Technical Specification Group Radio Access Network; Evolved Universal Terrestrial Radio Access (E-UTRA); Multiplexing and channel coding (Release 11)," 3GPP TS 36.212, V11.2.0, pp. 1-18 (Feb. 2013).

3rd Generation Partnership Project, "Technical Specification Group Radio Access Network; Evolved Universal Terrestrial Radio Access (E-UTRA); Physical Channels and Modulation (Release 11)," 3GPP TS 36.211, V11.2.0, pp. 1-109 (Feb. 2013).

3rd Generation Partnership Project, "Technical Specification Group Radio Access Network; Evolved Universal Terrestrial Radio Access (E-UTRA); Physical layer; Measurements (Release 11)," 3GPP TS 36.214, V11.1.0, pp. 1-14 (Dec. 2012).

3rd Generation Partnership Proiect, "Technical Specification Group Radio Access Network; Evolved Universal Terrestrial Radio Access (E-UTRA); LTE physical layer; General description (Release 11)," 3GPP TS 36.201, V11.1.0, pp. 1-13 (Dec. 2012).

3rd Generation Partnership Project, "Technical Specification Group Radio Access Network; Evolved Universal Terrestrial Radio Access (E-UTRA); Physical layer for relaying operation (Release 11)," 3GPP TS 36.215, V11.0.0, pp. 1-16 (Sep. 2012).

Xiao et al., "IMS Network Deployment Cost Optimization Based on Flow-Based Traffic Model," IEEE/IFIP Network Operations and Management Symposium—NOMS 2010, pp. 232-239 (2010).

"Network Topology," pp. 1-9 (Dec. 19, 2008).

Non-Final Office Action for U.S. Appl. No. 13/431,975 (May 24, 2013).

Commonly assigned, co-pending U.S. Appl. No. 13/447,160 for "Methods, Systems, and Computer Readable Media for Heuristics-Based Adaptive Protocol Parsing," (Unpublished, filed Apr. 13, 2012).

Commonly assigned, co-pending U.S. Appl. No. 13/431,975 for "Methods, Systems, and Computer Readable Media for Dynamically Controlling a Turbo Decoding Process in a Long Term Evolution (LTE) Multi-User Equipment (UE) Traffic Simulator," (Unpublished, filed Mar. 28, 2012).

Commonly assigned, co-pending U.S. Appl. No. 13/429,384 for "Scalable Architecture for Multiple User Equipment (Multi-UE) Simulation," (Unpublished, filed Mar. 25, 2012).

Commonly assigned, co-pending U.S. Appl. No. 13/408,787 for "Methods, Systems, and Computer Readable Media for Integrated Sub-Block Interleaving and Rate Matching," (Unpublished, filed Feb. 29, 2012).

Commonly assigned, co-pending U.S. Appl. No. 13/396,577 for "Methods, Systems, and Computer Readable Media for Performing Long Term Evolution (LTE) Channel Delineation," (Unpublished, filed Feb. 14, 2012).

Commonly assigned, co-pending U.S. Appl. No. 13/371,389 for "Methods, Traffic Simulators, and Computer Readable Media for Validating Long Term Evolution (LTE) Code Blocks and Transport Blocks," (Unpublished, filed Feb. 10, 2012).

Commonly assigned, co-pending U.S. Appl. No. 13/336,005 for "Methods, Systems, and Computer Readable Media for Reducing the Impact of False Downlink Control Information (DCI) Detection in

(56) References Cited

OTHER PUBLICATIONS

Long Term Evolution (LTE) Physical Downlink Control Channel (PDCCH) Data," (Unpublished, filed Dec. 23, 2011).
Commonly assigned, co-pending U.S. Appl. No. 13/326,264 for "Methods, Systems, and Computer Readable Media for Improved Long Term Evolution (LTE) Hybrid Automatic Repeat Request (HARQ) Processing," (Unpublished, filed Dec. 14, 2011).
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300, V9.9.0 (Dec. 2011).
"3rd Generation Partnership Project; Universal Mobile Telecommunications System (UMTS); Evolved Universal Terrestrial Radio Access (E-UTRA); Physical layer for relaying operation (Release 10)," 3GPP TS 36.216, v10.3.1 (Sep. 2011).
"3rd Generation Partnership Project; Technical Specification Group Radio Access Network; Evolved Universal Terrestrial Radio Access (E-UTRA); Physical layer procedures (Release 10)," 3GPP TS 36.213, V10.3.0 (Sep. 2011).
"3rd Generation Partnership Project; Technical Specification Group Radio Access Network; Evolved Universal Terrestrial Radio Access (E-UTRA); Multiplexing and channel coding (Release 10)," 3GPP TS 36.212, V10.3.0 (Sep. 2011).
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.3.0 (Sep. 2011).
"LTE; Evolved Universal Terrestrial Radio Access (E-UTRA); Physical layer; Measurements (3GPP TS 36.214 version 10.1.0 Release 10)," ETSI TS 136 214, V10.1.0 (Apr. 2011).
Third Generation Partnership Project, "Technical Specification Group, Radio Access Network; Evolved Universal Terrestrial Radio Access (E-UTRA); LTE Physical Layer; General Description," 3GPP TS 36.201 v10.0.0, Release 10 (Dec. 2010).
"IxCatapult Chassis," http://www.ixiacom.com/products/display?skey=ch_ixcatapult, pp. 1-2 (Downloaded from the Internet Apr. 14, 2010).
"Wireless Network Testing," Ixia, 915-2623-01 Rev A, pp. 1-18 (Jan. 2010).
"Wireless Network Testing," Ixia, 915-2622-01 Rev A, pp. 1-16 (Jan. 2010).
"3rd Generation Partnership Project, Technical Specification Group Radio Access Network; Requirements for Evolved Utra (E-UTRA) and Evolved Utran (E-UTRAN) (Release 9)," 3GPP TR 25.913, v9.0.0 (Dec. 2009).
"PDCCH Blind Decoding," PDCCH Decoding Example, http://www.steepstascent.com, pp. 1-6 (Copyright 2009-2011, downloaded from the Internet Dec. 4, 2011).
Notice of Allowance and Fee(s) Due for U.S. Appl. No. 12/337,285 (Mar. 19, 2012).
Final Office Action for U.S. Appl. No. 12/337,285 (Oct. 24, 2011).
Non-Final Office Action for U.S. Appl. No. 12/337,285 (Apr. 25, 2011).
"Coding of Speech at 8 kbit/s Using Conjuate-Structure Algebraic-Code-Excited Linear Prediction (CS-ACELP)," ITU-T, G.729, pp. 1-146 (Jan. 2007).
"Common Public Radio Interface (CPRI); Interface Specification," CPRI Specification V2.0, pp. 1-75 (Oct. 1, 2004).
Sjoberg et al., "Real-Time Transport Protocol (RTP) Payload Format and File Storage Format for the Adaptive Multi-Rate (AMR) and Adaptive Multi-Rate Wideband (AMR-WB) Audio Codecs," Network Working Group, RFC 3267 (Jun. 2002).
"40, 32, 24, 16 kbit/s Adaptive Differential Pulse Code Modulation (ADPCM)," CCITT, G.726, pp. 1-59 (1990).
"Pulse Code Modulation (PCM) of Voice Frequencies," ITU-T G.711, pp. 1-12 (Copyright 1988).
Final Office Action for U.S. Appl. No. 13/447,160 (Mar. 18, 2014).
Non-Final Office Action for U.S. Appl. No. 13/429,384 (Mar. 13, 2014).
Final Office Action for U.S. Appl. No. 13/154,166 (Mar. 3, 2014).
Final Office Action for U.S. Appl. No. 13/336,005 (Feb. 26, 2014).
Interview Summary for U.S. Appl. No. 13/447,160 (Feb. 25, 2014).
Final Office Action for U.S. Appl. No. 13/326,264 (Feb. 20, 2014).
Non-Final Office Action for U.S. Appl. No. 13/408,787 (Feb. 3, 2014).
Notice of Allowance and Fee(s) Due for U.S. Appl. No. 13/431,975 (Jan. 22, 2014).
3rd Generation Partnership Project, "Technical Specification Group Radio Access Network; Evolved Universal Terrestrial Radio Access (E-UTRA); Physical layer for relaying operation (Release 11)," 3GPP TS 36.216, V11.0.0, pp. 1-16 (Sep. 2012).
Ikuno et al., "System level simulation of LTE networks," 2010 IEEE 71st Vehicular Technology Conference: VTC2010-Spring, (May 16-19, 2010).
Abbes et al., "Protocol Analysis in Intrusion Detection Using Decision Tree," IEEE, Proceedings of the International Conference on Information Technology: Coding and Computing (ITCC'04), pp. 1-5 (2004).
Non-Final Office Action for U.S. Appl. No. 13/418,076 (Nov. 24, 2014).
Final Office Action for U.S. Appl. No. 13/429,384 (Nov. 21, 2014).
Non-Final Office Action for U.S. Appl. No. 13/154,166 (Oct. 28, 2014).
Notice of Publication for GB Patent Application No. 1411056.3 (Aug. 11, 2014).
Notice of Allowance and Fee(s) Due for U.S. Appl. No. 13/371,389 (Aug. 8, 2014).
Notice of Allowance and Fee(s) Due for U.S. Appl. No. 13/408,787 (Jul. 18, 2014).
Non-Final Office Action for U.S. Appl. No. 13/447,160 (Jul. 10, 2014).
Notice of Allowance and Fee(s) Due for U.S. Appl. No. 13/326,264 (Jun. 9, 2014).
Notice of Allowance and Fee(s) Due for U.S. Appl. No. 13/154,166 (Jun. 2, 2014).
Advisory Action for U.S. Appl. No. 13/447,160 (May 29, 2014).
Applicant-Initiated Interview Summary for U.S. Appl. No. 13/447,160 (May 23, 2014).
Applicant-Initiated Interview Summary for U.S. Appl. No. 13/154,166 (Apr. 28, 2014).
Non-Final Office Action for U.S. Appl. No. 13/429,384 (Apr. 9, 2014).
Notification of Transmittal of the International Search Report and the Written Opinion of the International Searching Authority, or the Declaration for International Application No. PCT/US2012/070877 (Mar. 28, 2013).
Dahlman et al., "10.4.9: Blind Decoding of PDCCHs," 4G LTE / LTE-Advanced for Mobile Broadband, pp. 199-202 (2011).
Rosenberg et al., "SIP: Session Initiation Protocol," RFC 3261, pp. 1-269 (Jun. 2002).
Sleator et al., "Self-Adjusting Binary Search Trees," Journal of the Association for Computing Machinery. vol. 32, No. 3, pp. 652-686 (Jul. 1985).

* cited by examiner

UPLINK PARALLEL ARCHITECTURE: OVERVIEW

UPLINK PARALLEL ARCHITECTURE:
MULTIPLE UEs WITH SMALL TRANSPORT BLOCK SIZE

METHODS, SYSTEMS, AND COMPUTER READABLE MEDIA FOR LONG TERM EVOLUTION (LTE) UPLINK DATA PROCESSING

TECHNICAL FIELD

The subject matter described herein relates to testing communications networks. More specifically, the subject matter relates to methods, systems, and computer readable media for performing long term evolution (LTE) uplink data processing.

BACKGROUND

Long term evolution (LTE) and other radio communications technologies can require significant infrastructure and configuration. Generally, network operators test various aspects of their network equipment to ensure reliable and efficient operation. Network operators typically simulate various conditions before equipment is deployed in a live network to decrease avoidable delays and/or other problems.

Various technical specifications, such as the 3rd Generation Partnership Project (3GPP) Technical Specifications 36.211, 36.212, 36.213, and 36.214, hereinafter respectively referred to as "TS 36.211", "TS 36.212", "TS 36.213", and "TS 36.214", define aspects of LTE communications. Generally, data from the network to a user device is referred to as downlink data and data from the user device to the network is referred to as uplink data. For example, user equipment (UE), such as a cellular mobile phone, a laptop, other user device, may communicate with an enhanced or evolved Node B (eNode B) via the cellular radio transmission link. Data that is sent from the eNode B to the user device is downlink data, and data that is sent from the user device to the eNode B is uplink data.

LTE data is usually transmitted using one or more multiplexing and/or modulation schemes. For example, in some LTE networks, downlink data is transmitted using an orthogonal frequency-division multiplexing (OFDM) and uplink data is transmitted using single carrier frequency-division multiple access (SC-FDMA). Such schemes may allow multiple streams of data to be sent simultaneously (e.g., at different frequencies, using multiple antennas). While such schemes may allow data to be communicated at high-speed, significant processing is required to encode and decode the data. For example, a user device may perform LTE uplink data processing on transport data blocks (TBs), such as channel encoding, rate matching, multiplexing, and interleaving of data and/or control streams. The uplink data may then be modulated and sent to an eNode B via an air interface.

Since LTE data processing is generally complex and communications are time-sensitive, it is important for LTE uplink data processing to be performed quickly and efficiently. For example, in testing environments where multiple user devices may be simulated by a traffic simulator, performing LTE uplink data processing quickly and efficiently may present additional issues as a finite amount of physical resources (e.g., hardware and/or firmware) may be available for the LTE uplink data processing.

Accordingly, in light of these difficulties, a need exists for improved methods, systems, and computer readable media for performing LTE uplink data processing.

SUMMARY

Methods, systems, and computer readable media for performing LTE uplink data processing are disclosed. One method occurs at an LTE multi-UE simulator. The method includes receiving at least one transport data block containing uplink data to be transmitted to a device under test and dynamically assigning, using processing information associated with the at least one transport data block, at least one physical resource from a plurality of dynamically assignable physical resources for processing the at least one transport block includes receiving at least one transport data block containing uplink data to be transmitted to a device under test.

The method also includes dynamically assigning, using processing information associated with the at least one transport data block, at least one physical resource from a plurality of dynamically assignable physical resources for processing the at least one transport block.

A system for performing LTE uplink data processing is also disclosed. The system includes an LTE multi-UE simulator. The multi-UE simulator includes a plurality of dynamically assignable physical resources. The LTE multi-UE simulator also includes an LTE uplink data processing module configured to receive at least one transport data block containing uplink data to be transmitted to a device under test and to dynamically assign, using processing information associated with the at least one transport data block, at least one physical resource from the plurality of dynamically assignable physical resources for processing the at least one transport block.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

As used herein, the terms "resource" or "physical resource" refer to hardware, firmware, or logic in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

Figure 1:
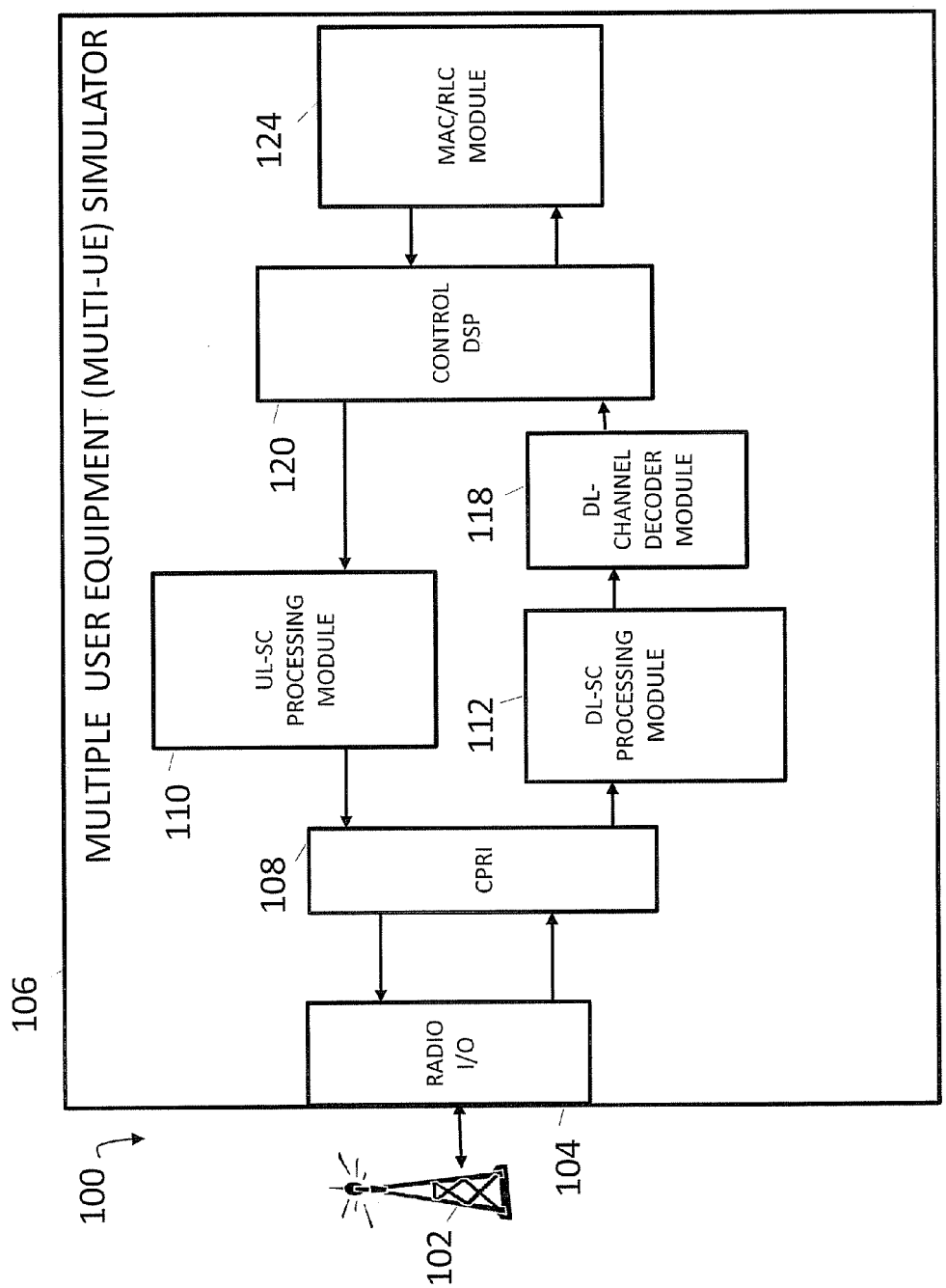
FIG. 1 is a diagram illustrating an exemplary device for performing LTE uplink data processing according to an embodiment of the subject matter described herein.

The subject matter described herein discloses methods, systems, and computer readable media for performing LTE uplink data processing. When testing LTE networks and/or other wireless communications network, it may be desirable to test the response of the network and other equipment under non-trivial load conditions. For example, it may be desirable to test communications between an eNode B by simulating multiple user devices simultaneously communicating with the eNode B.

Conventional LTE uplink data processing architectures typically require resources (e.g., physical resources used in implementing uplink signal chain blocks) to be devoted to a single user device at time. For example, a user device or UE may have an LTE uplink signaling chain or resource chain (e.g., one or more physical resources) for performing LTE uplink data processing, such as CRC attachment to a transport data block (TB), code block (CB) segmentation, CRC attachment to CBs, channel encoding, rate matching, CRC concatenation, multiplexing, and interleaving of data and/or control streams. Using such a resource chain, each TB associated with the user device may be processed serially by resources of the resource chain. As such, subsequent TBs may be queued or otherwise prevented from utilizing a resource until the resource is finished processing the current TB.

While conventional solutions may be suitable for LTE uplink data processing for a single user device, these sequential solutions may be impractical for an LTE traffic simulator, such as a multiple user equipment (multi-UE) simulator, because such equipment may need to simulate multiple user devices simultaneously communicating with the eNode B. As such, the LTE traffic simulator needs to generate and process multiple TBs contemporaneously with each other. Using conventional solutions, various issues arise with LTE uplink data processing for multiple user devices. For example, if an LTE traffic simulator uses a set of dedicated resources or a conventional resource chain, sequential processing would need to be performed repeatedly (e.g., for each simulated user device). As such, in this example, using a conventional resource chain would increase execution or processing time of data linearly as the number of simulated user devices increase and would cause untenable communication delays in many situations. To prevent increased processing time, an LTE traffic simulator may add a resource chain for each possible simulated user device. However, doing so would increase complexity and costs and may be resource inefficient, especially in situations where only a portion of the available resource chains are utilized or where only a portion of user devices capable of being simulated are simulated.

Advantageously, the present subject matter described herein can be used to efficiently perform LTE uplink data processing (e.g., within an allowed or expected execution time) and can conserve various resources. In some embodiments, the present subject matter described herein may include an LTE uplink data processing architecture where one or more resources may be dynamically assigned every transmission or transmission time interval (TTI) (e.g., a duration of a transmission on a radio link layer in an LTE network).

In some embodiments, resources may be dynamically assigned based on current processing conditions and/or needs. For example, when processing three TBs of various sizes in a TTI using a system having eight assignable resources, four assignable resources may be used in processing a large-sized TB associated with a simulated user device 'X', three different assignable resources may be used in processing a medium-sized TB associated with a simulated user device 'Y', and the remaining assignable resource may be used in processing a small-sized TB associated with a simulated user device 'Z'. Continuing with this example, in subsequent TTIs, the same eight assignable resources may be assigned differently depending on TB size of TBs to be processed and/or other factors. In contrast, conventional solutions may require a large number of resources for processing data due to dedicated resources for each user device and/or may require longer execution time due to repeated and sequential use of resources for each device. Hence, a multiple user device (multi-UE) simulator according to the present subject matter described herein may perform LTE uplink data processing quicker and using significantly less resources than conventional solutions.

FIG. 1 is a diagram illustrating an exemplary LTE network 100 for performing LTE uplink data processing according to an embodiment of the subject matter described herein. Network 100 may include an eNode B 102 and a multi-UE simulator 106. ENode B 102 may represent any suitable entity (e.g., a base transceiver station (BTS), node B, etc.) for providing data via an air interface. For example, eNode B 102 may be an LTE mobile network entity having functionality similar to that of a radio network controller (RNC) and a base station (BS) in 2G networks or an RNC and a Node B in 3G mobile networks. In some embodiments, eNode B 102 may communicate directly with LTE user devices and is responsible for header compression, ciphering, reliable delivery of packets, admission control, and radio resource management. ENode B 102 may also communicate with various other modules and/or nodes, e.g., radio head 104 and/or multi-UE simulator 106.

Multi-UE simulator 106 may be any suitable entity (e.g., a stand-alone node or distributed multi-node system) configured to simulate one or more LTE user devices, to send communications to eNode B 102, to receive communications from eNode B 102, and/or to test communications capabilities of eNode B 102. For example, multi-UE simulator 106 may be used for simulating network load conditions and analyzing performance of eNode B 102 and/or other network nodes under the simulated conditions. In some embodiments, multi-UE simulator 106 may be a single node or may be distributed across multiple computing platforms or nodes. Multi-UE simulator 106 may include various modules for performing one or more aspects described herein. Multi-UE simulator 106 may include a radio input/output (I/O) module (e.g., a radio head) 104, a CPRI module 108, an uplink signaling chain (UL-SC) processing module 110, a downlink signaling chain (DL-SC) processing module 112, a downlink channel decoder module 118, a control digital signaling processing (DSP) module (control DSP) 120, and a medium access control and/or radio link controller (MAC/RLC) module 124. It will be appreciated that modules may include various components. For example, each of modules 108-124 may be a field-programmable gate array (FPGA), an application-specific integrated circuit (ASIC), or software executing on a processor.

Radio head 104 may represent any suitable entity for controlling and/or performing radio I/O functions; e.g., sending or receiving communications from eNode B 102 or multi-UE simulator 106. In some embodiments, radio head 104 may be distinct from or integrated with multi-UE simulator 106. Radio head 104 may perform radio frequency up and down conversions and/or analog-to-digital/digital-to-analog conversion. Radio head 104 may also include operation and management processing capabilities and a standardized optical interface to connect to one or more components. Radio head 104 may communicate using various communications protocols. For example, radio head 104 may be connected to multi-UE simulator 106 via a fiber optic cable using a common public radio interface (CPRI) protocol or may be connected via another interface or using other protocols. Data transmitted over a CPRI link may consist of digitized samples of the analog baseband signal, plus a low bandwidth control channel. Data carried over the CPRI link may be a continuous stream of numbers, representing the digitized samples of the baseband waveform. A CPRI connection may support several antennas, where one or more antennas may represent a sector or a multiple-input and multiple-output (MIMO) antenna of a sector.

Radio head 104 may also communicate with eNode B 102 using various protocols and digital modulation methods. For example, radio head 104 may receive or send data via an air interface using OFDM or SC-FDMA modulation methods.

CPRI module 108 may be any suitable entity (e.g., a communications interface) for communicating with radio head 104 and/or other network entity via CPRI or other protocols. For example, a wired connection (e.g., a fiber optic cable) may be used in communicating data between radio head 104 and CPRI module 108. In another example, such as in test environments, a wired connection may be used to connect CPRI 108 and eNode B 102, thereby bypassing radio head 104. On the downlink, CPRI module 108 may convert the LTE downlink data into digitalized data portions, such as frames or subframes. In some embodiments, CPRI module 108 may convert an OFDM signal and periodically (e.g., every seventy one micro seconds) or aperiodically (e.g., when data is available) provide a digitalized data portion to other modules, or sub-modules therein. Generally, receiving modules may attempt to process a digitalized data portion (e.g., an OFDM symbol) prior to another digitalized data portion being provided by CPRI module 108. On the uplink, CPRI module 108 may collect digitalized data portions, such as SC-FDMA symbols, into subframes and frames. CPRI module 108 may transmit the SC-FDMA signal towards eNode B 102 via radio head 104.

UL-SC processing module 110 may be any suitable entity (e.g., an ASIC, an FPGA, or software executing on a processor) used in processing uplink data (e.g., simulated user device traffic data). For example, UL-SC processing module 110 may perform one or more aspects associated with uplink baseband processing for sending traffic towards eNode B 102. UL-SC processing module 110 may perform data integrity operations (e.g., generating and inserting cyclic redundancy check (CRC) values for TBs or portions thereof), LTE channel data mapping or encoding, multiplexing operations, rate matching, interleaving, and/or other data processing.

DL-SC processing module 112 may be any suitable entity (e.g., an ASIC, an FPGA, or software executing on a processor) used in processing downlink data (e.g., data from eNode B 102). For example, DL-SC processing module 112 may perform one or more aspects associated with downlink baseband processing for data transmitted from eNode B 102. DL-SC processing module 112 may perform data integrity operations (e.g., checking and removing CRC values), LTE channel data de-mapping or decoding, de-multiplexing operations, and/or other data processing.

In some embodiments, DL-SC processing module 112 may perform channel de-mapping or delineation. For example, LTE data (e.g., data portions of a radio subframe) may be associated with various LTE channels. Data for particular channels may be noncontiguous and/or change relative locations often, e.g., every subframe. Channel delineation may involve identifying LTE data associated with particular LTE channels and/or providing the data to corresponding physical channels or buffers.

Exemplary LTE channels and/or signals may include a physical broadcast channel (PBCH), physical control format indicator channel (PCFICH), a physical downlink control channel (PDCCH), a physical hybrid ARQ indicator channel (PHICH), a physical downlink shared channel (PDSCH), a physical multicast channel (PMCH), a reference signal (RS), a cell-specific reference signal (CSRS), a primary synchronization channel (PSS), a secondary synchronization channel (SSS), a physical uplink shared channel (PUSCH), a physical uplink control channel (PUCCH), a sound reference signals (SRS), and demodulation reference signals (DMRS), a downlink channel, and/or an uplink channel.

DL-SC processing module 112 may be used in symbol processing (e.g., control symbols and/or shared channel symbols). For example, DL-SC processing module 112 may read, access, or otherwise identify parameters stored in a radio subframe. DL-SC processing module 112 may use parameters or other variables for extracting control information and downlink data. Exemplary variables may include a system subframe value, a PHICH group number (Ng) value, a bandwidth value (BW) value, a physical cell identity (ID), or a PHICH duration value.

In some embodiments, DL-SC processing module 112 may decode channel data or resource elements prior to performing additional decoding operations. For example, PCFICH data may be decoded before some information (e.g., a control symbols number parameter value) is determinable. DL-SC processing module 112 may communicate with various other modules (e.g., control DSP 120). For example, DL-SC processing module 112 may send signaling control information (e.g., downlink control information (DCI) and/or parameters to control DSP 120. Control DSP 120 and/or DL-SC processing module 112 may use the DCI to determine, among other things, what resources (e.g., frequencies, time slots, etc.) that eNode B 102 is allowing the user device to use for uplink and downlink, which is referred to as grant information, because eNode B 102 is granting the use of a specified subset of transmission resources to the user device. Depending on how much data the user device wants to send or receive, how many other user devices are trying to access the same eNode B, and other factors, the grant information may, and usually does, change rapidly over time, say every TTI. Downlink channel decoder module 118 may be any suitable entity (e.g., an ASIC, an FPGA, or software executing on a processor) used in decoding downlink data. For example, downlink channel decoder module 118 may include a FPGA or processor configured to perform turbo decoding of downlink data.

Control DSP 120 may be any suitable entity (e.g., an ASIC, an FPGA, or software executing on a processor) configurable for controlling the overall operation of simulator 106, for simulating the LTE physical layer, and for processes uplink and downlink data to separate the data into data intended for upper layers and control information. For example, Control DSP 120 may perform one or more aspects associated with uplink baseband processing and/or downlink baseband processing. Control DSP 120 may perform data integrity operations (e.g., checking and removing CRC values), code segmentation, and/or other data processing. Control DSP 120 may also act as an access controller and may provide data to MAC/RLC module 124.

Control DSP 120 may receive control information associated with a data portion (e.g., a radio subframe). As stated above, control DSP 120 may determine various resources to be used in processing. Control DSP 120 may also provide various information, including grant information, to various modules, such as UL-SC processing module 110 and/or MAC/RLC module 124.

In some embodiments, control DSP 120, or modules therein, may perform HARQ processing associated with multiple user devices. For example, control DSP 120 may include functionality for managing HARQ processes for multiple LTE user devices, for processing PDCCH information (e.g., scheduling and/or grant information), for processing PHICH information (e.g., HARQ indicators (His) or feedbacks), and for scheduling or transmitting PUSCH data (e.g., scheduling data for HARQ retransmissions).

MAC/RLC module 124 may be any suitable entity (e.g., a processor) for performing various actions, such as interfacing with higher layers involved in LTE communications and data processing. For example, MAC/RLC module 124 may include a processor or a microcontroller. MAC/RLC module 124 may include medium access control (MAC) layer and radio link control (RLC) layer functions. MAC/RLC module 124 may receive decoded downlink data and send the data through a media access control (MAC) layer and radio link control (RLC) layer for further processing. MAC/RLC module 124 may also receive uplink data from higher layer and perform RLC and MAC layer operations. The uplink data (e.g., TB) may be sent to other modules, e.g., DSP 120 and/or UL-SC processing module 110, for appropriate processing.

In some embodiments, uplink data may be provided by MAC/RLC module 124 in groups of data called TBs for one or more UEs. The size of TBs provided by MAC/RLC module 124 may be defined or determined by uplink grant information received in the downlink control channel from eNode B 102. MAC/RLC module 124 and/or control DSP 120 may send TBs to UL-SC processing module 110 for further processing. At UL-SC processing module 110, for each TB, a CRC may be generated before the TB is split or segmented into smaller CBs (code blocks). A CRC may also be generated for each CB. Each CB may be channel encoded, interleaved, and rate matched. The rate matched CBs may be concatenated to a single data block, and then multiplexed with control information, interleaved and scrambled before being mapped to appropriate radio frequency (RF) components (e.g., sub-carriers and OFDM symbols). The radio resource-mapped data after modulation may be sent to CPRI module 108 as an SC-FDMA signal, and transmitted via an air interface to eNode B 102.

It will be appreciated that the above described modules are for illustrative purposes and that features or portions of features described herein may be performed by different and/or additional modules, components, or nodes. For example, a control decoder module may incorporate or include functionality of channel decoder 118 and control DSP 120.

Figure 2:
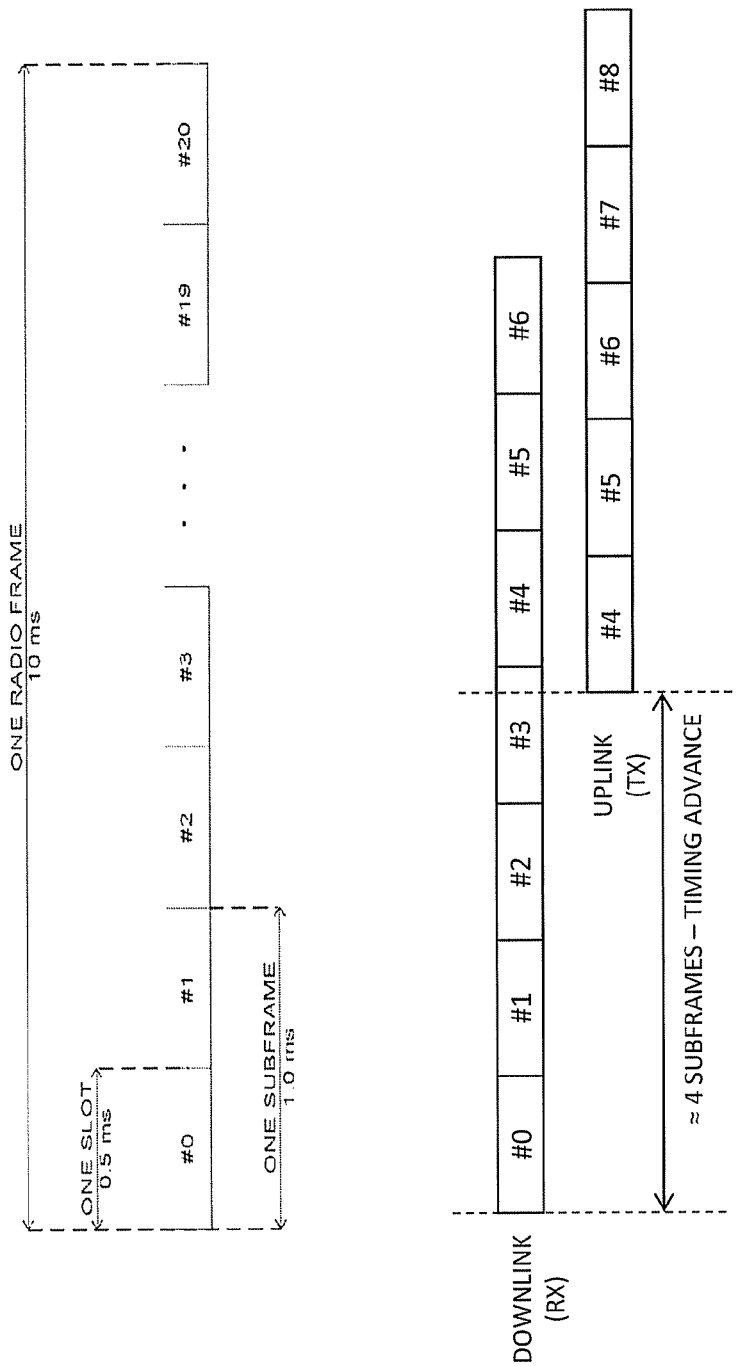
FIG. 2 is a diagram illustrating logical data portions of an LTE radio frame.

FIG. 2 is a diagram illustrating logical data portions of an LTE radio frame. As stated above, uplink and downlink data may be transmitted or sent in LTE radio frames, e.g., from eNode B 102 via radio head 104 to multi-UE simulator 106 or vice versa. Each LTE radio frame may be 10 milliseconds (ms) long comprising 10 subframes of 1 ms each. Each subframe may include 2 slots and/or 14 OFDM symbols. A slot may be 0.5 ms long and may include various amounts of LTE data. LTE data may be stored as modulated symbols in sub-carriers within an OFDM symbol. Each modulated symbol in a sub-carrier may typically represent two, four, or six bits. Sub-carriers may be data streams that are spaced 15 kilohertz apart from each other. A sub-carrier may typically carry data at a maximum rate of 15 kilosymbols per second (ksps). In some embodiments, a LTE downlink subframe may typically include multiple resource blocks (RBs) of 12 sub-carriers, each sub-carrier with 14 OFDM symbols. The LTE downlink subframe may be partitioned into two equal downlink slots. Each downlink slot may include multiple blocks of 12 sub-carriers with 6 or 7 symbols per sub-carrier (e.g., depending on whether frame uses an extended cyclic prefix or a normal cyclic prefix).

FIG. 2 also depicts a timing difference between downlink and uplink data. In some embodiments, downlink control information (DCI) on subframe N is for PDSCH data in the same subframe. Downlink control information (DCI) on subframe N has scheduling or grant information for PUSCH in subframe N+4. Scheduling information may include grant information indicating certain RF components allocated for transmission or retransmissions for data associated with various UEs. This means that a user device may have about 4 ms from the start of the downlink signal to the start of transmission of the uplink signal. For example, as depicted in FIG. 2, a timing difference may be about 4 ms or four subframes. Within this time period, user device needs to perform downlink processing, decode the DCI, send the grant information to a higher layer, where a packet data unit (PDU) is segmented from the radio link control (RLC), get the packet data unit (PDU), also referred to herein as a TB, and do all physical layer uplink processing and perform SC-FDMA modulation for RF transmission on the uplink. For reasons that will be explained below, this timing constraint poses technical challenges not only to designers of user devices but also to designers of test equipment that simulates traffic from multiple user devices. Further, finite hardware and logic resources available for data communications may pose technical challenges for such test equipment when simulating multiple user devices.

In some embodiments, after allocating time for all these functions from the available 4 ms interval, the time left for uplink physical layer processing and RF transmission is about 1 ms. Uplink physical layer processing may be logically split into two parts, a first part (Part 1 processing) for preparing a TB for SC-FDMA modulation and signal generation and a second part (Part 2 processing) for performing SC-FDMA modulation and signal generation. In some embodiments, the time available for Part 1 processing may further be limited to 0.7 ms and Part 2 processing may be limited to about 0.3 ms.

Part 1 processing may be based on uplink control information, including scheduling information that can affect TB size, channel allocation, and resource block allocation, among other things. Numerous combinations of these parameters may occur based on scheduling information, which may differ among subframes. As such, Part 1 processing time may vary significantly between subframes and TBs. Further, when simulating multiple user devices, another level of complexity may arise as each user device may be associated with independent scheduling information.

Part 2 processing may include scrambling, mapping data bits to modulation symbols, performing a Discrete Fourier transform (DFT) encoding for SC-FDMA, mapping data to an uplink resource grid, and SC-FDMA signal generation and modulation on to an RF carrier. In some embodiments, since Part 2 processing may be performed on a block of channel bits for all user devices, the computational complexity and processing time is fixed for various combinations of user devices and different resource allocations for each user device's in a subframe. For example, the computational complexity and time for first few steps of Part 2 processing, such as scrambling and DFT mapping, may be linearly or proportionally based on the aggregate block size for all user devices. Later steps of Part 2 processing, such as SC-FDMA signal generation, may be performed within a fixed amount of time. Hence, because Part 2 processing includes steps that are linear in time and/or performed in a fixed amount of time, various cases, including worst case scenarios, may be performed within a particular time constraint imposed by the system or LTE standard (e.g., about a few symbols time or around 0.3 ms).

Figure 3:
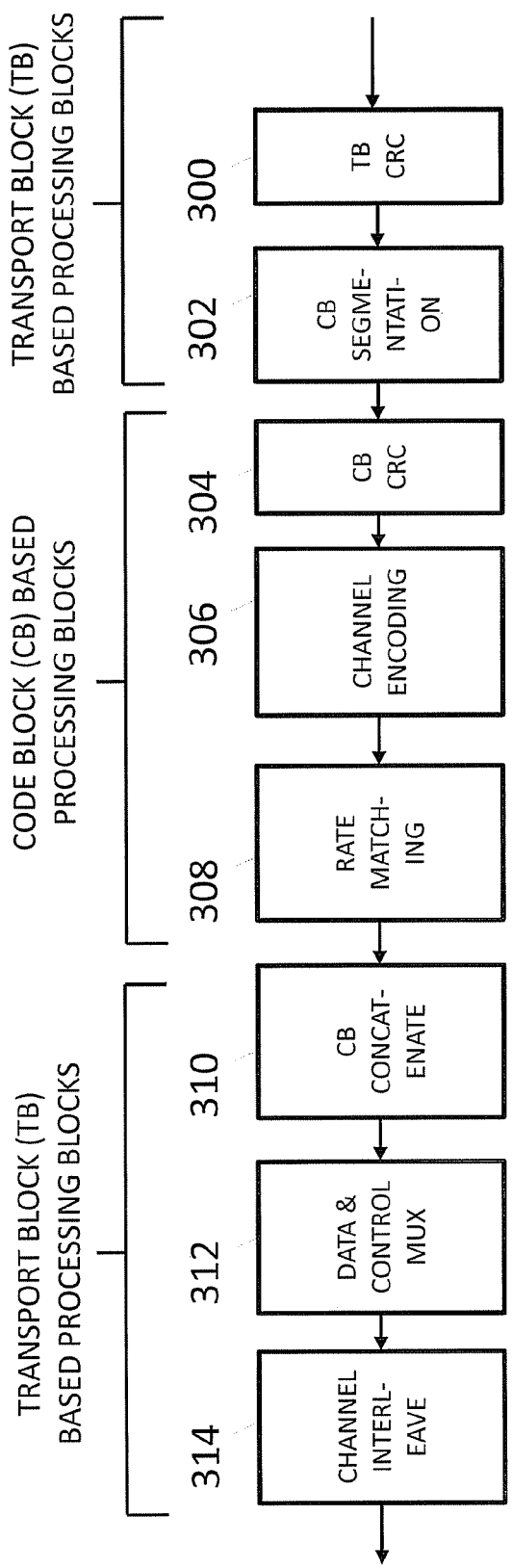
FIG. 3 is a diagram illustrating an exemplary processing sequence for performing LTE uplink data processing.

FIG. 3 is a diagram illustrating an exemplary processing sequence or resource chain for performing LTE uplink data processing. In this embodiment, various steps 300-314 are depicted for performing one or more aspects of Part 1 processing. Each of the steps 300-314, or portions thereof, may be performed by one or more physical resources, such as an ASIC, an FPGA, or software executing on a processor. In some embodiments, steps 300-314, or portions thereof, may be performed by UL-SC processing module 110.

In some embodiments, multi-UE simulator 106 may concurrently perform some Part 1 processing for simulated user devices. The simulated user devices may be associated with various TB or PDU sizes (e.g., as dictated by scheduling information in DCI provided by eNode B 102). Depending on the amount of simulated user devices, the PDU size for each user device, and/or other factors, varying amounts of UE physical resources may be needed to perform Part 1 processing in an adequate and timely manner.

In some embodiments, multi-UE simulator 106, or a module therein, may assign physical resources (e.g., from a common pool of physical resources) based on various factors and/or related scheduling scenarios. For example, exemplary scheduling scenarios may include a large number of user devices, each with small PDUs on the same subframe, one user device with a large PDU in a subframe, one user device with a large PDU and a few user devices with small PDUs, one user device with a small PDU on many resource blocks (RBs), and a few user devices with large PDUs on fewer RBs, one user device with large PDU on two RBs and a few user devices with small PDUs on three RBs, and others. In addition, since Part 1 processing may involve multiple combinations, including extreme cases; assignable resources as described herein may be used to cover all these cases. For example, by using assignable resources when possible to perform processing steps in parallel or concurrently, an optimum architecture, e.g., in terms of physical resource utilization and time performance, may be implemented.

In FIG. 3, steps 300-314 may be associated with various types of resources, such as non-assignable resources and assignable resources. For example, steps 300-302 and steps 310-314 may be TB based processing blocks which may be performed by fixed or non-assignable resources, while steps 304-308 may be CB based processing blocks which may be performed by assignable resources. In some embodiments, non-assignable resources are assignable per TTI to different UEs and/or TBs, and assignable resources are shared resources which are assigned to multiple UEs and/or TBs within a TTI. In another example, different steps may be performed by assignable resources and/or non-assignable resources.

In some embodiments, non-assignable resources may not be dynamically assigned during a TTI. For example, a non-assignable resource may be associated with a particular resource chain and may process data for a particular user device or a TB during a TTI. During this TTI, a non-assignable resource, such as an FPGA, may be configured to receive a TB associated with a user device 'Y' and compute a CRC for the TB. The non-assignable resource may be configured to compute CRCs for a TB associated with user device 'Y' and no other user devices during the TTI. However, in subsequent TTIs, non-assignable resources may be assigned to different TBs and/or UEs. For example, a non-assignable resource may be associated with various resource chains over a period of time (e.g., multiple TTIs) and may process data for various user devices or TBs.

In some embodiments, an assignable resource may be dynamically assigned during a TTI. For example, an assignable resource, such as FPGA logic and memory, may be part of a pool of resources that can be dynamically assigned and/or utilized based on one or more factors, such as TB size and/or numbers of CBs needed to be processed concurrently. For instance, at an initial time 'A' or during a first TTI, an assignable resource 'I' may be used in processing data associated with a particular user device. However, at a subsequent time 'B' or during a second TTI, the same assignable resource 'I' may be used in conjunction with another assignable resource 'J' for processing data associated with a different user device. Hence, over a period of time, each assignable resource may be assigned to process data associated with various user devices depending on resource availability, load, scheduling information, and/or other factors.

At step 300, a TB associated with a user device may be received and a CRC may be computed for the TB. In some embodiments, TBs may vary in size. For example, grant information provided by eNode B 102 may indicate different TB sizes for various simulated user devices. MAC/RLC module 124 may send a TB having a particular size and other characteristics based on the grant information.

At step 302, the TB may be segmented into one or more code blocks (CBs). In some embodiments, the number of CBs generated may be based on the size of the TB. Depending on various processing information, such as a TB size and/or a number of CBs generated during segmentation, one or more assignable resources may be assigned to process the CBs. For example, four assignable resources may be capable of performing steps 304-308, each of the four assignable resources may concurrently process a different CB associated with the same TB.

At step 304, a CRC may be computed for each CB associated with the TB. Depending on the number of assignable resources available, processing information (e.g., TB size and/or channel bits), and/or other factors (e.g., number of CBs to process), one or more assignable resources may be assigned and utilized in computing the CRC for each CB. In an embodiment where one assignable resource is utilized and multiple CBs are to be processed, the resource may process each CB in a serial manner. In an embodiment where multiple assignable resources are utilized and multiple CBs are to be processed, each of the assignable resources may process one or more CBs concurrently or in a parallel manner.

At step 306, each CB may be channel encoded. For example, an assignable resource may be configured to use a Turbo encoding algorithm. The assignable resource may use a turbo encoder to produce coded CBs. In some embodiments, one or more assignable resources may be assigned and utilized in performing channel encoding.

In some embodiments, assignable resources may be proportional in processing ability. For example, if three assignable resources are used for performing step 304, three assignable resources may be used to perform a subsequent step (e.g., steps 306). In this example, the assignable resources used to perform additional steps may include different or additional resources from those used previously. In some embodiments, assignable resources may be disproportional in processing ability and/or vary depending on processing step to be performed. For example, the number of assignable resources used for performing one processing step may be different from the number of assignable resources used in performing other steps.

At step 308, each coded CB may be rate matched. For example, an assignable resource may be configured to produce a bit stream that is rate matched to the available RF components required by subsequent steps in the LTE uplink data processing chain. In some embodiments, one or more assignable resources may be assigned and utilized in performing rate matching.

At step 310, coded CBs may be concatenated. For example, the coded CBs may be joined to create one data block. In some embodiments where multiple assignable resources are utilized and multiple coded CBs are generated, the assignable resources may provide the coded CBs to a single non-assignable resource. The non-assignable resource may perform the concatenation.

At step 312, data and control information may be multiplexed. For example, PUSCH data and/or other payload data may be multiplexed with uplink control information (UCI).

At step 314, multiplexed data may be interleaved. For example, channel data may be separated or arranged in a non-contiguous way to increase data integrity or transmission performance.

In some embodiments, additionally processing steps (Part 2 processing) may be performed for transmitting uplink data to eNode B 102 via an SC-FDMA signal.

It will be appreciated that the above described processing sequence is for illustrative purposes. In some embodiments, a processing sequence may include additional and/or different processing sequences. In some embodiments, different and/or additional steps may be performed by assignable resources or non-assignable resources.

Figure 4:
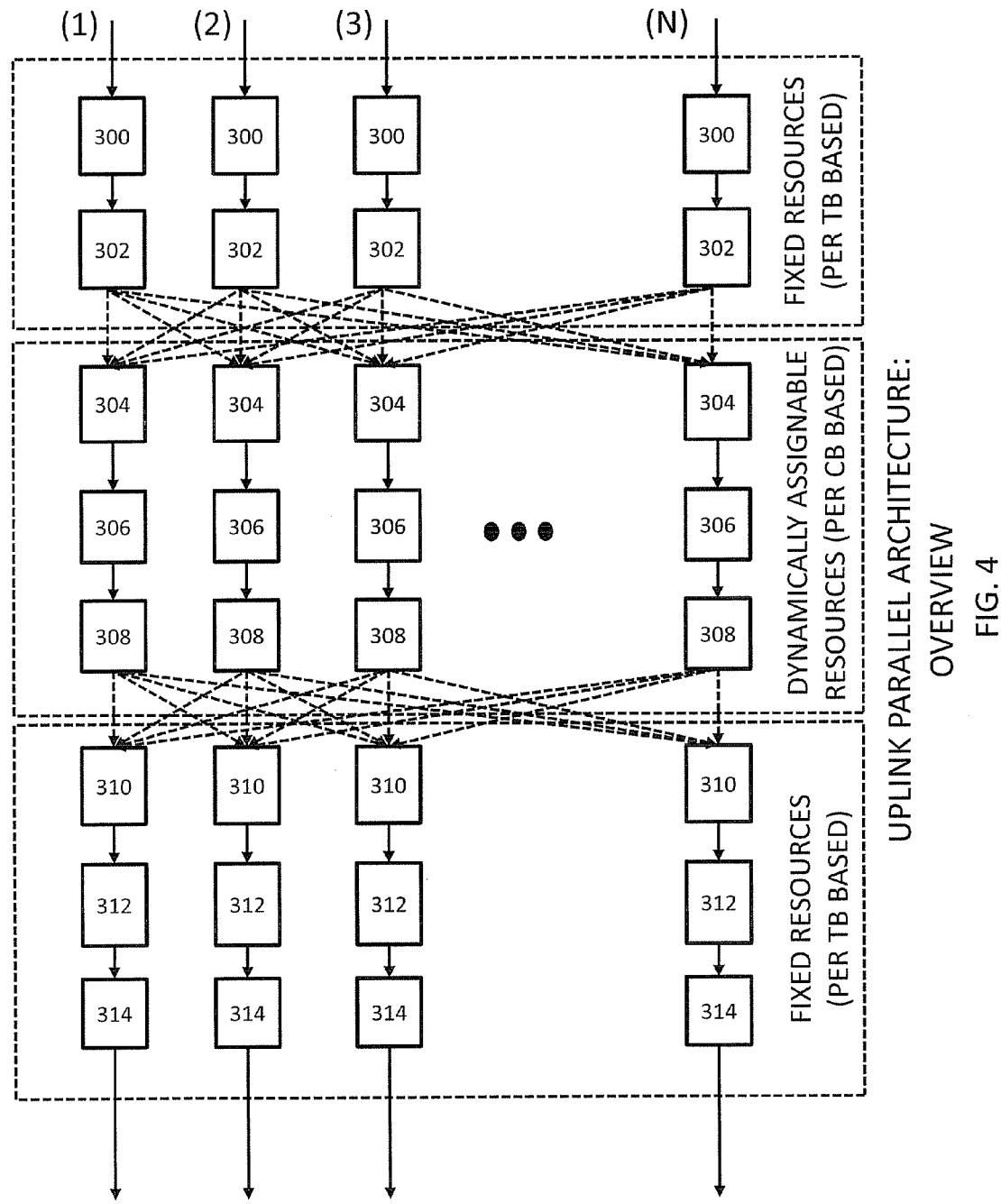
FIG. 4 is a diagram illustrating an exemplary LTE uplink data processing architecture having assignable resources according to an embodiment of the subject matter described herein.

FIG. 4 is a diagram illustrating an exemplary LTE uplink data processing architecture having assignable resources according to an embodiment of the subject matter described herein. In this embodiment, multiple processing sequences (labeled 1 to N) are depicted. For example, multi-UE simulator 106 may include 13 resource chains. In another example, multi-UE simulator 106 may include a number of resource chains based on the maximum number of CBs in a TB. Each resource chain may perform processing steps 300-314, where each step may be performed by or correspond to a resource, such as an ASIC, an FPGA, or software executing on a processor. As stated above, each resource chain may include non-assignable resources and assignable resources.

In some embodiments, each resource chain may be capable of processing data associated with a user device and/or a TB. For example, TBs associated with simulated user devices may be processed using resource chains 1 to N. At steps 300, the TBs may be received and CRCs may be computed for the TBs. At steps 302, output (e.g., CBs) may be processed by assignable resources (e.g., when performing steps 304-308 and/or other steps). For example, multiple arrows from step 302 of resource chain 1 to various steps 304, generated CBs associated with the TB may be processed by assignable resources.

In some embodiments, assignable resources may be dynamically assigned for performing one or more steps. For example, assignable resources may be assigned based on a number of simulated user devices, a TB or PDU size, an RB size or amount, or other factors. By dynamically assigning resources, certain processing steps may be performed concurrently or in a parallel manner, thereby allowing LTE uplink data processing to be performed faster. For example, using assignable resources, CB-related steps (e.g., steps 304-308) may be performed concurrently, thereby reducing processing time associated with processing TBs that generates multiple CBs (e.g., large-sized or medium-sized TBs).

In some embodiments, multi-UE simulator 106 or a related module may assign more resources to process large- and medium-size TBs than small-sized TBs such that TBs associated with a particular uplink radio frame may finish processing at or near the same time. Hence, an uplink parallel architecture having assignable resources as described herein may be used to perform LTE uplink data processing for multiple user devices in a timely and resource efficient manner.

In some embodiments, for each respective resource chain, after one or more assignable resources perform CB-related processing (e.g., steps 304-308); step 310-314 may be performed, e.g., by one or more non-assignable resources.

Figure 5:
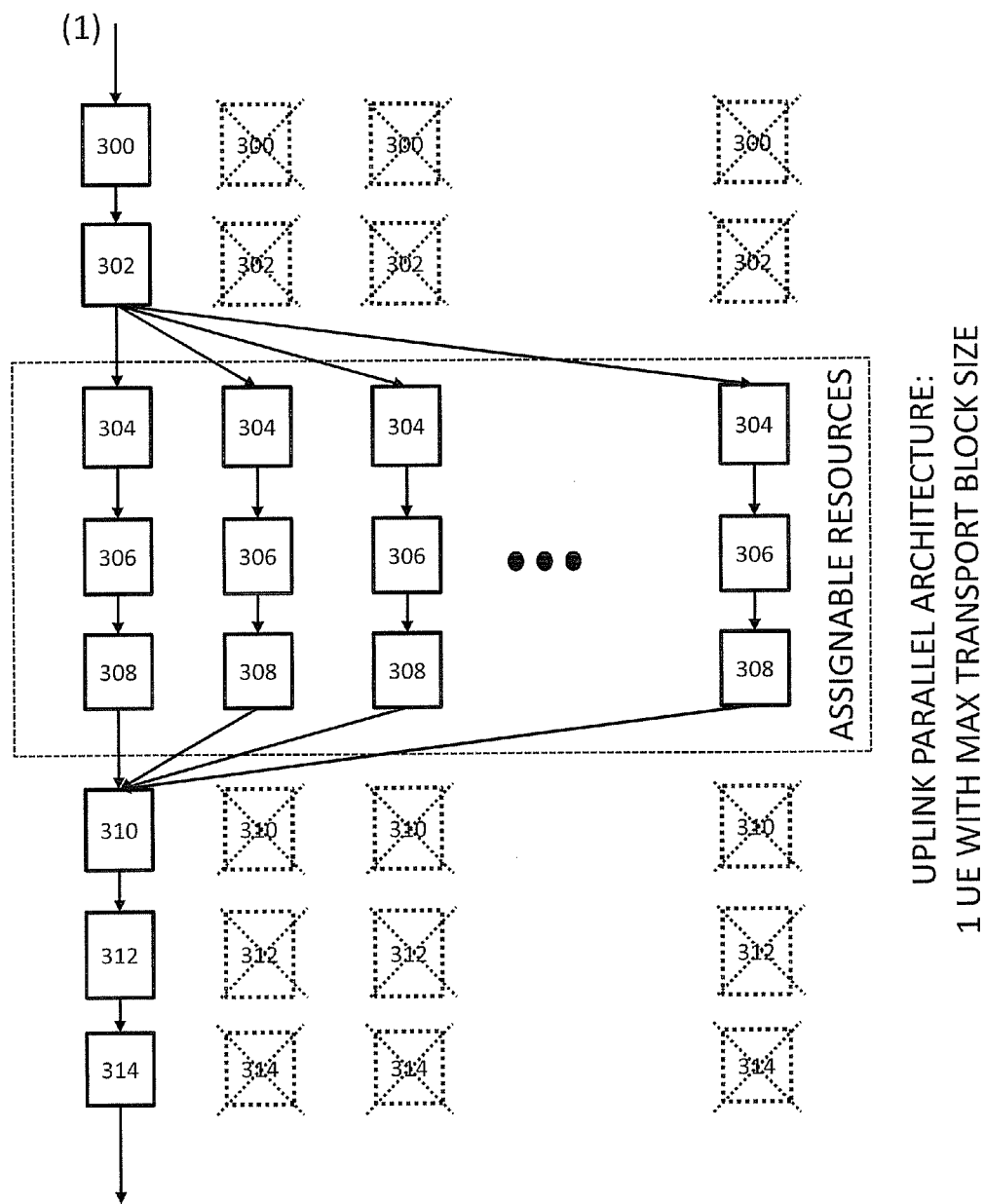
FIG. 5 is a diagram illustrating an exemplary processing sequence using assignable resources according to an embodiment of the subject matter described herein.

FIG. 5 is a diagram illustrating an exemplary processing sequence using assignable resources according to an embodiment of the subject matter described herein. In this embodiment, a large-sized TB associated with a simulated user device may be processed using resource chain 1. For example, the TB may have a large TB size (e.g., of around 75,000 bits). At step 300, the TB may be received and a CRC may be computed for the TB. At step 302, multiple CBs may be generated from the TB. For example, a large-sized TB may be segmented into 13 CBs. In this example, a total of 13 assignable resources may be available for performing step 304 and each assignable resource may be assigned a CB for processing.

As indicated by multiple arrows from step 302 of resource chain 1 to various steps 304, CBs associated with the TB may be processed by multiple assignable resources. In some embodiments, the assignable resources may each concurrently process a different CB of the CBs associated with the TB. Assignable resources may also be assigned and/or utilized for performing additional steps. For example, additional assignable resources may be used in performing steps 306 and 308.

In some embodiments, after assignable resources perform CB-related processing (e.g., steps 304-308), CBs may be received and concatenated at step 310. For example, a non-assignable resource may receive all processed coded CBs associated with a TB from multiple assignable resources. The non-assignable resource may concatenate the CBs into one data portion. Steps 312-314 may also be performed, e.g., by one non-assignable resource chain.

It will be appreciated that the above described processing sequence is for illustrative purposes. In some embodiments, a processing sequence may include additional and/or different processing sequences. In some embodiments, different and/or additional steps may be performed by assignable resources or non-assignable resources.

Figure 6:
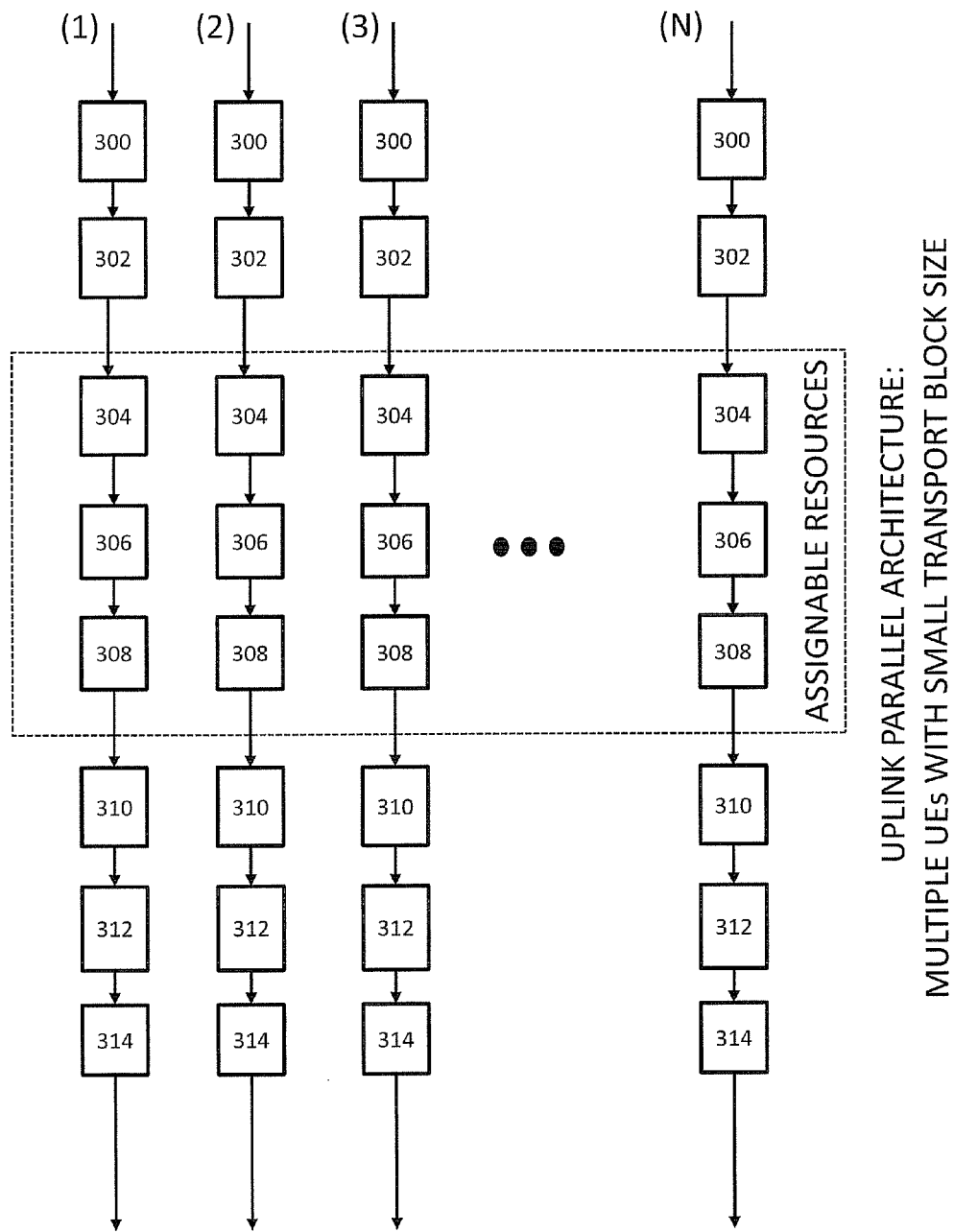
FIG. 6 is a diagram illustrating another exemplary processing sequence using assignable resources according to an embodiment of the subject matter described herein

FIG. 6 is a diagram illustrating another exemplary processing sequence using assignable resources according to an embodiment of the subject matter described herein. In this embodiment, multiple small-sized TBs associated with multiple simulated user devices may be processed using multiple resource chains 1 to N. For example, each TB may have a small TB size less than or equal to one CB size (e.g., of around 6,000 bits). Each resource chain may process a different TB, and the TBs may belong to different UEs. For example, a different TB may be processed at steps 300-302 of each respective resource chain.

At step 300 of each respective resource chain, a TB may be received and a CRC may be computed for the TB. At step 302 of each respective resource chain, one CB may be generated. As indicated by an arrow from step 302 to step 304 of each respective resource chain, an assignable resource may be assigned to process the CB. Assignable resources may also be assigned and/or utilized for performing additional and/or different steps. For example, for a given resource chain, an assignable resource may be used in performing step 306 and another assignable resource may be used in performing step 308.

In some embodiments, for each respective resource chain, after one or more assignable resources perform CB-related processing (e.g., steps 304-308); step 310-314 may be performed, e.g., by one or more non-assignable resources.

It will be appreciated that the above described processing sequence is for illustrative purposes. In some embodiments, a processing sequence may include additional and/or different processing sequences. In some embodiments, different and/or additional steps may be performed by assignable resources or non-assignable resources.

Figure 7:
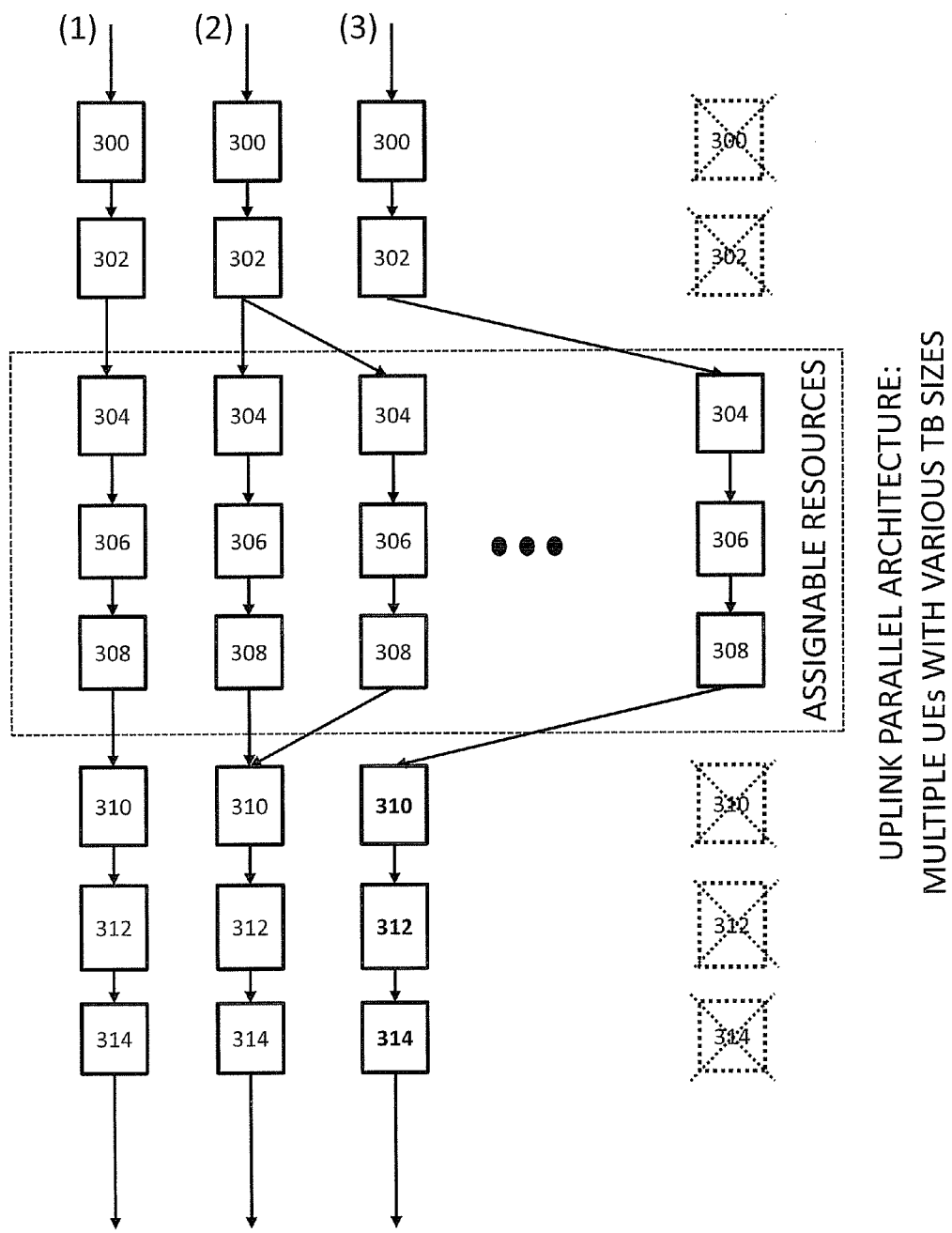
FIG. 7 is a diagram illustrating yet another exemplary processing sequence using assignable resources according to an embodiment of the subject matter described herein.

FIG. 7 is a diagram illustrating yet another exemplary processing sequence using assignable resources according to an embodiment of the subject matter described herein. In this embodiment, multiple TBs of various sizes may be processed using multiple resource chains 1 to N. For example, a TB associated with resource chain 1 may have a small TB size (e.g., one CB), a TB associated with resource chain 2 may have a larger TB size (e.g., two CBs), and a TB associated with resource chain 3 may have a very large TB size (e.g., ten CBs). Each resource chain may receive and process a different TB. For example, a different TB may be processed at steps 300-302 of each respective resource chain.

At step 300 of each respective resource chain, a TB may be received and a CRC may be computed for the TB. At step 302 of each respective resource chain, one or more CBs may be generated. As indicated by arrows from various steps 302 to steps 304, one or more assignable resources may be assigned. For example, one assignable resource may be assigned to perform step 304 of resource chain 1, two assignable resources may be assigned to perform step 304 of resource chain 2, and the remaining assignable resources may be assigned to perform step 304 of resource chain 3. Assignable resources may also be assigned and/or utilized for performing additional steps. For example, for a given resource chain or CB, an assignable resource may be used in performing step 306 and/or step 308.

In some embodiments, after assignable resources perform CB-related processing (e.g., steps 304-308), CBs may be received and concatenated at step 310. For example, at step 310 of resource chain 2, a non-assignable resource may receive all related coded CBs from multiple assignable resources. The non-assignable resource may concatenate the CBs into one data portion. Steps 312-314 may also be performed by one or more non-assignable resources.

It will be appreciated that the above described processing sequence is for illustrative purposes. In some embodiments, a processing sequence may include additional and/or different processing sequences. In some embodiments, different and/or additional steps may be performed by assignable resources or non-assignable resources.

Figure 8:
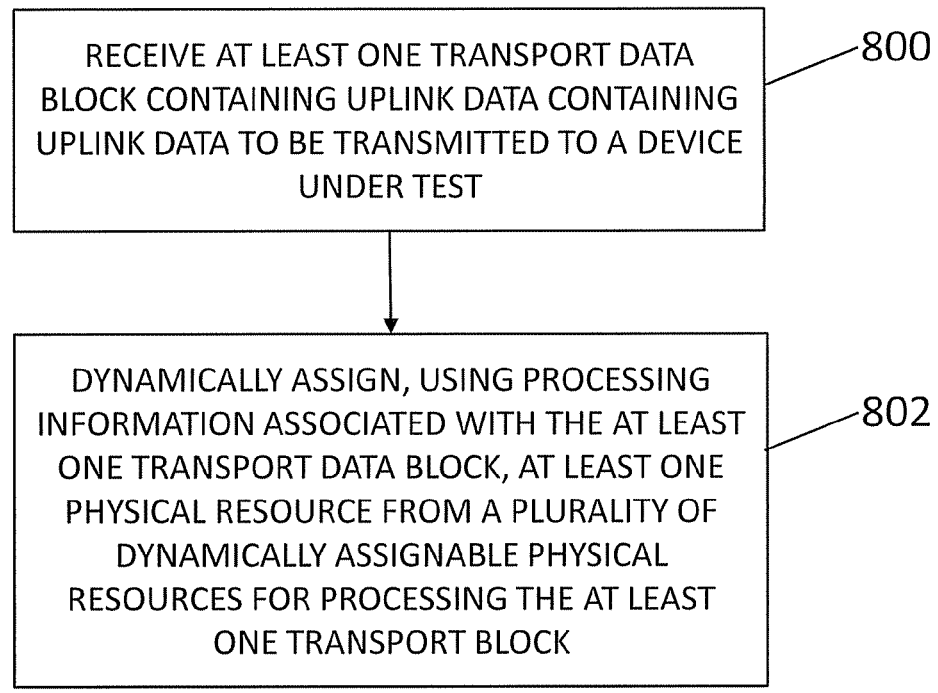
FIG. 8 is a diagram illustrating an exemplary process for performing LTE uplink data processing according to an embodiment of the subject matter described herein.

FIG. 8 is a diagram illustrating an exemplary process for performing LTE uplink data processing according to an embodiment of the subject matter described herein. In some embodiments, the exemplary process described herein, or portions thereof, may be performed by multi-UE simulator 106, UL-SC processing module 110, and/or another module.

In step 800, at least one transport data block containing uplink data to be transmitted to a device under test may be received. For example, input associated with a simulated user device may be received by UL-SC processing module 110. In some embodiments, the input may include multiple transport data blocks associated with user devices simulated by the multi-UE simulator. In some embodiments, the device under test may include an evolved node B or an LTE network node.

In step 802, at least one physical resource from a plurality of dynamically assignable physical resources may be dynamically assigned for processing the at least one TB. The at least one physical resource may be assigned by using processing information associated with the at least one TB. For example, multi-UE simulator 106, or a module therein, may include a set or pool of assignable resources that may be assigned to process CBs or portions of TBs for one or more user devices. UL-SC processing module 110 or another module may be configured to assign, using processing information (e.g., TB size or a number of CBs to be processed) associated with the at least one TB, at least one physical resource from the pool of assignable resources.

In some embodiments, after determining a number of CBs to be processed, one or more physical resources may be assigned based on the number of CBs to be processed. For instance, three physical resources may be assigned for processing CBs associated with a medium-sized TB and one physical resource may be assigned for processing CBs associated with a small-sized TB. When processing different uplink data (e.g., data transmitted via a subsequent radio frame), physical resources may be reassigned based on new processing information (e.g., updated scheduling information) or other relevant factors.

In some embodiments, processing information may include a number of TBs received, a size of each TB received, a number of CBs to be processed, a number of simulated user devices associated with TBs received, resource block allocation of TB data, or type of modulation for transmission of TB data.

In some embodiments, processing the at least one transport block includes performing a cyclic redundancy check (CRC) associated with a CB, performing channel encoding associated with a CB, or performing rate matching associated with a CB. For example, an assignable resource may be configured to perform a cyclic redundancy check (CRC) associated with a CB, perform channel encoding associated with a CB, and/or perform rate matching associated with a CB.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for performing long term evolution (LTE) uplink data processing, the method comprising:
at an LTE multi-UE simulator:

receiving at least one transport data block containing uplink data to be transmitted to a device under test, wherein the at least one transport data block includes multiple transport data blocks associated with user devices simulated by the LTE multi-UE simulator; and dynamically assigning, for a transmission time interval and using processing information associated with the at least one transport data block, two or more assignable uplink data processing resources from a plurality of dynamically assignable uplink data processing resources for processing the at least one transport block, wherein each of the two or more assignable uplink data processing resources is configured to process a different code block of code blocks associated with the at least one transport data block.

2. The method of claim 1 wherein the device under test includes an evolved node B or an LTE network node.

3. The method of claim 1 wherein one of the two or more assignable uplink data processing resources includes a field-programmable gateway array (FPGA), an application-specific integrated circuit (ASIC), or a processor.

4. The method of claim 1 wherein processing the at least one transport block includes performing a cyclic redundancy check (CRC) associated with each code block of the code blocks, performing channel encoding associated with each code block of the code blocks, or performing rate matching associated with each code block of the code blocks.

5. The method of claim 1 wherein the processing information includes a number of the at least one transport data block received, a size of each of the at least one transport data block received, a number of the code blocks to be processed, a number of the simulated user devices associated with the at least one transport data block received, resource block allocation of transport data block data, or type of modulation for transmission of the transport data block data.

6. The method of claim 1 wherein dynamically assigning, for the transmission time interval and using processing information associated with the at least one transport data block, the two or more assignable uplink data processing resources includes determining a number of the code blocks to be processed and assigning the two or more assignable uplink data processing resources based on the number of the code blocks to be processed.

7. The method of claim 1 wherein one of the two or more assignable uplink data processing resources is configured to process data associated with the at least one transport data block or two or more of the simulated user devices.

8. The method of claim 1 wherein the two or more uplink assignable data processing resources concurrently process the code blocks.

9. A system for long term evolution (LTE) uplink data processing, the system comprising:
an LTE multi-UE simulator including:
a plurality of dynamically assignable uplink data processing resources; and
an LTE uplink data processing module configured to receive at least one transport data block containing uplink data to be transmitted to a device under test, wherein the at least one transport data block includes multiple transport data blocks associated with user devices simulated by the LTE multi-UE simulator and to dynamically assign, for a transmission time interval and using processing information associated with the at least one transport data block, two or more assignable uplink data processing resources from the plurality of dynamically assignable uplink data processing resources for processing the at least one transport block, wherein each of the two or more assignable uplink data processing resources is configured to process a different code block of code blocks associated with the at least one transport data block.

10. The system of claim 9 wherein the device under test includes an evolved node B or an LTE network node.

11. The system of claim 9 wherein one of the two or more assignable uplink data processing resources includes a field-programmable gateway array (FPGA), an application-specific integrated circuit (ASIC), or a processor.

12. The system of claim 9 processing the at least one transport block includes performing a cyclic redundancy check (CRC) associated with each code block of the code blocks, performing channel encoding associated with each code block of the code blocks, or performing rate matching associated with each code block of the code blocks.

13. The system of claim 9 wherein the processing information includes a number of the at least one transport data block received, a size of each of the at least one transport data block received, a number of the code blocks to be processed, a number of the simulated user devices associated with the at least one transport data block received, resource block allocation of transport data block data, or type of modulation for transmission of the transport data block data.

14. The system of claim 9 wherein the LTE uplink data processing module is configured to dynamically assign, for the transmission time interval and using processing information associated with the at least one transport data block, the two or more assignable uplink data processing resources by determining a number of the code blocks to be processed and assigning the two or more assignable uplink data processing resources based on the number of the code blocks to be processed.

15. The system of claim 9 wherein one of the two or more assignable uplink data processing resources is configured to process data associated with the at least one transport data block or two or more of the simulated user devices.

16. The system of claim 9 wherein the two or more assignable uplink data processing resources concurrently process the code blocks.

17. A non-transitory computer readable medium comprising computer executable instructions that when executed by a processor perform steps comprising:
at an LTE multi-UE simulator:
receiving at least one transport data block containing uplink data to be transmitted to a device under test, wherein the at least one transport data block includes multiple transport data blocks associated with user devices simulated by the LTE multi-UE simulator; and
dynamically assigning, for a transmission time interval and using processing information associated with the at least one transport data block, two or more assignable uplink data processing resources from a plurality of dynamically assignable uplink data processing resources for processing the at least one transport block, wherein each of the two or more assignable uplink data processing resources is configured to process a different code block of code blocks associated with the at least one transport data block.

* * * * *